United States Patent [19]

Klancnik

[11] Patent Number: 4,504,991
[45] Date of Patent: Mar. 19, 1985

[54] FIRE-RESISTANT MATTRESS AND HIGH STRENGTH FIRE-RETARDANT COMPOSITE

[75] Inventor: Alvin R. Klancnik, Park Ridge, Ill.

[73] Assignee: Sealy, Incorporated, Chicago, Ill.

[21] Appl. No.: 386,101

[22] Filed: Jun. 7, 1982

[51] Int. Cl.³ .......................... A47C 5/12; A47C 7/18
[52] U.S. Cl. ........................................ 5/459; 5/483; 297/DIG. 5; 428/71; 428/76; 428/251; 428/252; 428/285; 428/316.6
[58] Field of Search ............... 428/251, 252, 268, 273, 428/285, 290, 304.4, 319.1, 71, 76, 228, 255, 316.6; 5/459, 483; 297/DIG. 5

[56] References Cited

U.S. PATENT DOCUMENTS

| | | | |
|---|---|---|---|
| 3,512,192 | 5/1970 | Simon | 5/345 |
| 3,670,348 | 6/1972 | Irwin | 5/345 |
| 3,818,521 | 6/1974 | Richards, Jr. | 5/345 |
| 4,060,280 | 11/1977 | Van Loo | 297/452 |
| 4,085,247 | 4/1978 | Godfried | 428/319.1 |
| 4,092,752 | 6/1978 | Dougan | 5/345 |
| 4,174,420 | 11/1979 | Anolick et al. | 428/304.4 |
| 4,265,953 | 5/1981 | Close | 428/319.1 |
| 4,265,963 | 5/1981 | Matalon | 428/290 |
| 4,277,532 | 7/1981 | Czepel et al. | 428/319.1 |
| 4,294,489 | 10/1981 | Anolick et al. | 297/452 |
| 4,351,872 | 9/1982 | Brosseau et al. | 428/316.6 |

OTHER PUBLICATIONS

"Flammability Characteristics of Healthcare Mattresses", Aug. 1977, by Anolick et al.
"Could You Have Helped Prevent This?", by Golding Industries.
"A Guide to VONAR Interliners".
"Durability of VONAR Interliners in Upholstered Furniture and Mattresses".
"Recommended Guidelines on the Use of VONAR Interliner in the Manufacture of Mattresses".
"Adhesives for VONAR Interliners".
"List of Adhesives Which Have Passed the Test for Use with VONAR Interliners", (1/1979).
"Du Pont Announces the new VONAR Interliners".
"Du Pont VONAR 3 Interliners ... an Extra Measure of Protection from Fire in Mattresses".
"The Polyurethane Mattress with VONAR 3 Interliner was not Consumed in the Bedclothes Fire".
2 Letters from Owens-Corning Fiberglass Corp. dated May 18, 1982.
Letter from Dayco dated Aug. 29, 1979 with price list attached.

Primary Examiner—William J. Van Balen
Attorney, Agent, or Firm—Willian Brinks Olds Hofer Gilson & Lione Ltd.

[57] ABSTRACT

An improved mattress includes a composite made of a layer of a fire retardant material capable of providing a heat barrier bonded to a layer of high tensile strength material, such as fiberglass fabric. The composite encloses at least most and generally practically all of the flammable ingredients of the mattress. When exposed to a fire, the fire retardant material chars, thereby creating a heat shield that protects the inside of the mattress while the high tensile strength material holds the mattress together and prevents the mattress from bursting open thereby exposing the flammable ingredients thereof to the fire.

The composite of the present invention is made by bonding a fire-retardant material capable of providing a heat barrier to a high tensile strength material.

10 Claims, 8 Drawing Figures

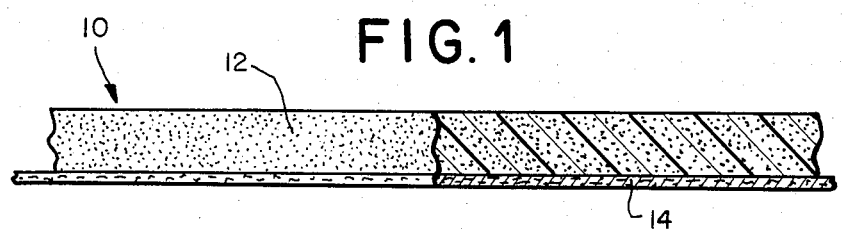
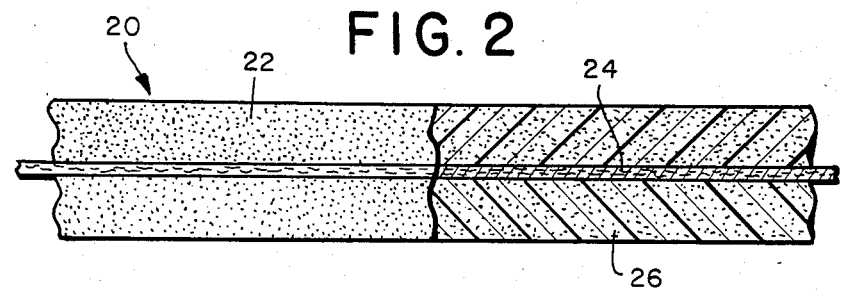
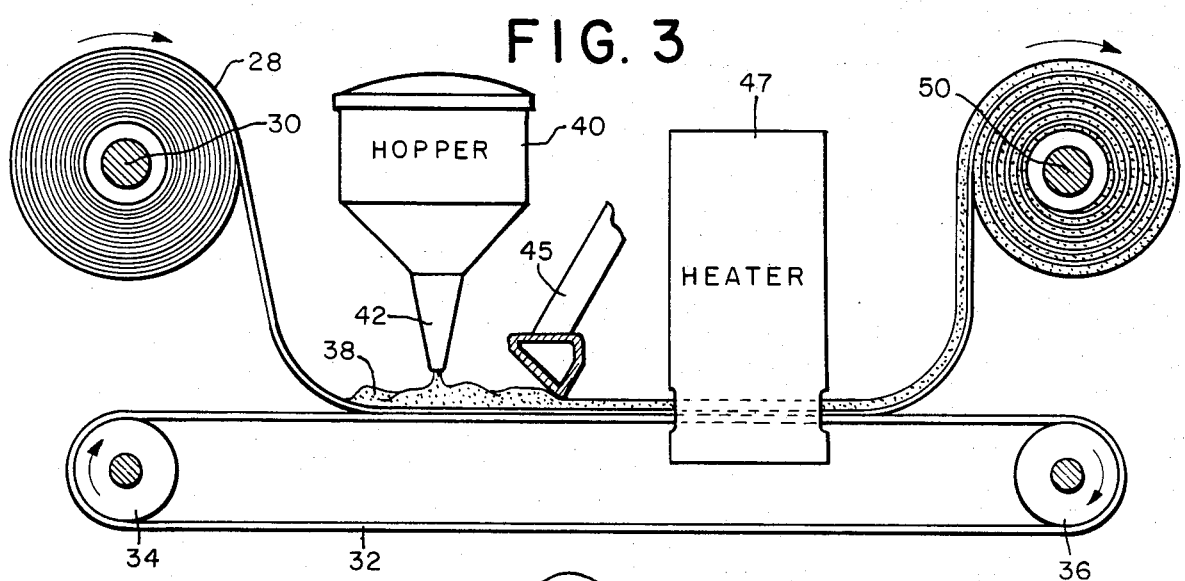
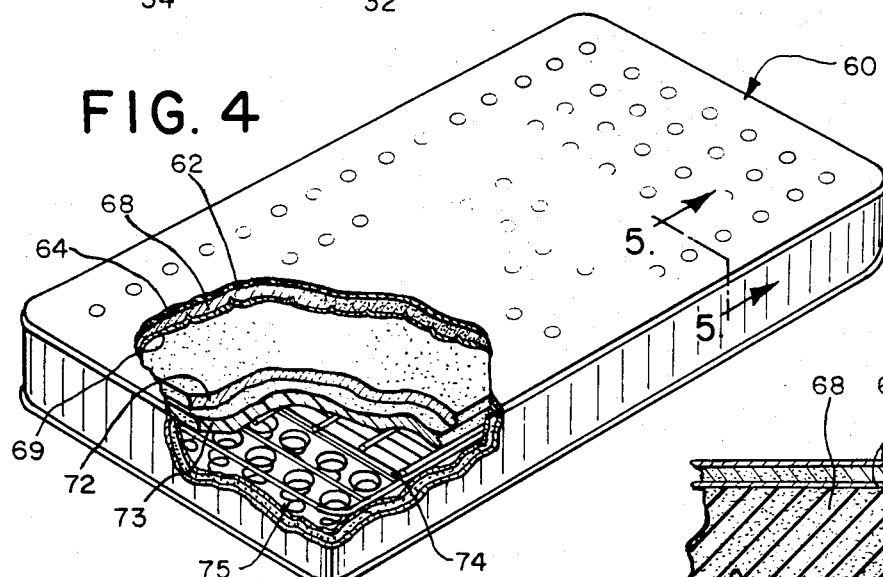
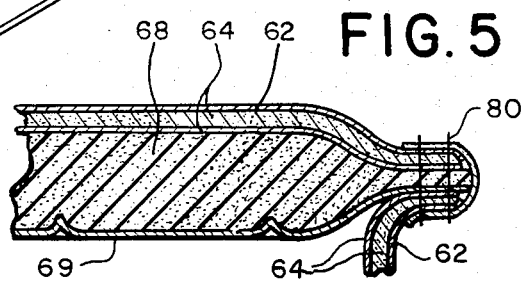

FIRE-RESISTANT MATTRESS AND HIGH STRENGTH FIRE-RETARDANT COMPOSITE

BACKGROUND OF THE INVENTION

This invention relates to fire retardant composites and fire-resistant mattresses. In particular, it relates to fire retardant composites capable of withstanding significant tensile forces and to fire resistant mattresses made using such composites.

Each year thousands of people die in home and institutional fires that started in or were fueled by mattresses. The traditional mattresses contain highly flammable materials that are necessary to provide the required comfort for the users. Most mattresses include a layer of ticking material which is generally flammable. Once the bedding on the mattress catches on fire, the flames ignite the ticking. Within a few minutes, the surface of the mattress is ablaze. The fire then spreads to the cushion layer which is generally made of either polyurethane foam or cotton. Such cushion layers are readily ignitable and an excellent fuel for the fire.

The springs of the traditional mattresses are in normal use held under compression by the materials that enclose them. Once the fire begins consuming these materials, the springs burst the mattress open thereby fully exposing the flammable materials inside the mattress to the fire. This accelerates the fire. The heat from the fire and combustion of flammable materials produce toxic gases which accumulate in the room. As the temperature in the room rises, these gases ignite producing a phenomenon called "flashover." During "flashover", the entire space of the room becomes engulfed in flames. The temperature of the room in which the mattress is located can reach 1300° C. or higher. If the door to the room in which the mattress is located is open, the flames follow the exiting gases creating a moving wall of fire.

Since traditional mattresses are generally one of the chief sources of fuel for a fire and since once ignited they burn rapidly and emit toxic and flammable gases, the damages, injuries and loss of life resulting from fires could be significantly reduced if mattresses were substantially fire proofed.

Attempts have been made to produce commercially acceptable fireproofed mattresses and to use fire retardant materials in their construction to prevent the spread of fire. None of these attempts have been entirely satisfactory.

For example, U.S. Pat. No. 3,512,192 (Simon) discloses a mattress made of a multilayer material. On the outside, the mattress is covered with a chemically treated ticking with no insulating value. Adjacent to the ticking is a layer of polyurethane foam and to the inside of the polyurethane foam is a layer of fiberglass matting. The fiberglass matting can be replaced by an asbestos pad. To the inside of the fiberglass matting or asbestos pad is another layer of polyurethane foam. See also Column 2, lines 41-45. The problem with the approach disclosed in the Simon patent is that the chemically treated ticking has practically no insulating value and therefore it cannot adequately protect the materials it encloses from the fire. Once the fire spreads to the polyurethane layer, it is fueled just like in the traditional mattresses causing a conflagration.

Additionally, the use of the fiberglass matting is impractical even under the polyurethane foam because the fiberglass fibers gradually break off and eventually penetrate the surface of the mattress causing serious discomfort and irritation to the user. The minute fiberglass fibers can also become embedded in the linen. Since they cannot be removed from the linen by laundering, the contaminated linen has to be replaced in order to avoid irritation or even allergic reaction of the user.

U.S. Pat. No. 3,670,348 (Irwin) discloses the use of a fiberglass pad inside the ticking to enclose the combustible portion of the mattress. The problem with this approach is that the fiberglass pad is not a durable and resilient surface. Therefore, such mattresses lack the soft feel of traditional mattresses. Moreover, during use, the minute fibers of the fiberglass pad break off and penetrate the surface of the mattress causing discomfort and irritation to the user as described in connection with the Simon patent. This problem is more serious in mattresses disclosed by the Irvine patent than in those disclosed by the Simon patent because the fiberglass pad is adjacent to the thin outside ticking layer which is easily penetrated.

U.S. Pat. No. 3,818,521 (Richards) discloses the use of a heat conducting metallic foil between the ticking and the padding layers. The foil carries away heat that is applied to a small area of the mattress and thereby prevents the ticking from bursting into flames. This approach suffers from several disadvantages. It works only if the heat source is small in intensity and localized. For example, the Richards mattress will help prevent fire if a burning cigarette or a match is placed thereon. This approach does not work, however, in situations where the source of fire is not highly localized. If other parts of the room are on fire, the metallic foil is ineffective to prevent mattress fire.

U.S. Pat. No. 4,092,752 (Dougan) discloses the use of a layer of flame retarded flexible polyurethane foam and optionally an outer layer of flexible polymide foam to enclose the flammable parts of the mattress. Similarly, the paper entitled Flammability Characteristics of Healthcare Mattresses by Anolick et al, presented at the August 1977 American Hospital Association's Annual Convention, discloses mattresses that include VONAR TM interliners, inside the ticking layer, completely enclosing polyurethane foam. Such mattresses are reported to significantly improve the controllability of fires. However, once charred, VONAR TM lacks the strength to keep the mattress intact. Accordingly, at elevated temperatures, such mattresses burst open thereby exposing to the fire the flammable parts. The entire mattress then explodes into flames. The ticking used in the mattresses disclosed by the Anolick article has no insulating value and therefore does not provide a barrier to fires.

More recently, Golding Industries, Inc. proposed mattresses having flame-resistant ticking marketed under the trademark SANDEL. This approach suffers from several disadvantages. The first disadvantage is its cost. The SANDEL ticking includes fiberglass fibers. But in order to make the ticking soft and flexible enough to be acceptable to the user, very fine fibers must be used. Such ticking is significantly more expensive than the conventional ticking.

Secondly, the fiberglass fibers break off during use and cause irritation and allergic reactions to at least some users. The fibers are so minute that they cannot be removed from the linen by laundering. Accordingly, once the ticking starts breaking, the linen then on the mattress has to be replaced.

Finally, since the SANDEL ticking does not create a heat shield, the heat from the fire can lead to outgasing, i.e., the release of toxic and flammable gases from the materials inside the mattress.

There is, therefore, a long felt and still unsatisfied need for a mattress that does not ignite and burst into flames either immediately upon exposure to a fire or upon exposure to elevated temperatures normally encountered in household or institutional room fires but which offers all the comfort properties of a traditional mattress, including softness and conformance to the body contours of the user.

Thus, one object of the present invention is to provide an improved mattress that satisfies the above stated need.

Another object of the present invention is to provide a composite useful in the construction of said improved mattress and a process for making such composite.

A further object of the present invention is to provide an improved fire resistant mattress which lasts at least as long as the conventional mattresses and retains its fire resistant properties throughout its useful life.

Still another object of the present invention is to provide an improved mattress whose outer layer has an excellent surface feel and softness and does not cause skin irritation to the users.

A still further object of the present invention is to provide an improved fire-resistant mattress and fire-retardant composites for use in such mattress, which are inexpensive and have a long, useful life.

Still another object of the present invention is to provide a mattress which generates significantly less smoke and toxic gases than traditional mattresses when exposed to a fire.

Other objects of the present invention will become apparent to those skilled in the art upon studying this disclosure.

BRIEF DESCRIPTION OF THE DRAWINGS

FIG. 1 is a cross-sectional view of one composite layer constructed in accordance with the present invention.

FIG. 2 is a cross-sectional view of another composite layer constructed in accordance with the present invention.

FIG. 3 is a schematic representation of the process for making the composite of the present invention.

FIG. 4 is a perspective view, partially in cross-section, of a mattress constructed in accordance with the present invention.

FIG. 5 is a cross-sectional view of the mattress of FIG. 4 taken along lines 5—5 thereof.

BRIEF DESCRIPTION OF THE INVENTION

Figure 6:
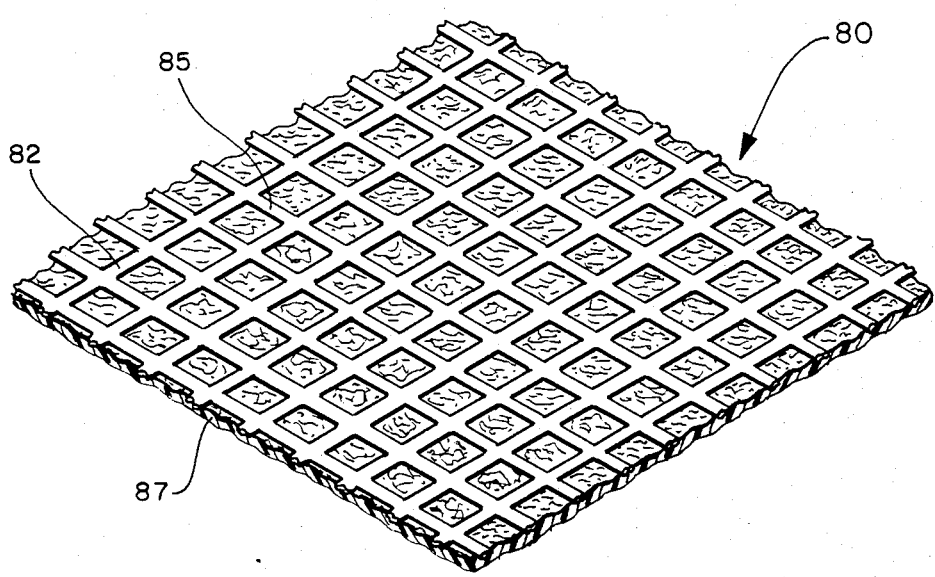
FIG. 6 is a perspective view of a fiberglass fabric useful in the composite of the present invention.

The present invention provides an improved fire resistant mattress that does not burst into flames when exposed to fire even after being exposed to high temperatures normally reached in household or institutional room fires. The improved mattress of the present invention is relatively inexpensive to construct, does not irritate the user's skin and its fire resistant properties last for the duration of its useful life.

The present invention also provides a fire-retardant composite that can be used to make fire-resistant mattresses and a process for making such composite.

The mattress constructed in accordance with the present invention includes a layer comprising a composite made of a layer of a fire retardant material capable of providing a heat barrier bonded to a layer of high tensile strength material, such as fiberglass fabric. The composite encloses at least most and generally practically all of the flammable ingredients of the mattress. When exposed to a fire, the fire retardant material chars, thereby creating a heat shield that protects the inside of the mattress while the high tensile strength material holds the mattress together and prevents the mattress from bursting open to expose the flammable ingredients thereof to the fire.

The composite of the present invention is made by bonding a fire-retardant material capable of providing a heat barrier to a high tensile strength material. If neoprene foam such as VONAR TM is used, the foam is directly deposited on a high tensile strength material such as a fiberglass fabric. Then the neoprene foam is cured which also causes it to become bonded to the fiberglass fabric.

DETAILED DESCRIPTION OF THE INVENTION

The present invention provides a fire resistant mattress that substantially does not fuel room fires and when exposed to flames provides a heat barrier between the fire and the parts of the mattress that emit toxic and flammable gases upon exposure to heat. Unless the fire is already a conflagration, the mattresses of the present invention do not burst open when exposed to flames. The invention, therefore, eliminates a significant fire hazard.

In addition, the mattress of the present invention can be easily and inexpensively manufactured with a minimal departure from the conventional, presently used methods of manufacture. The mattress of the present invention also has a good surface feel, does not irritate the user's skin and its fire retarding properties extend for the duration of its useful life.

The invention will now be further described in connection with the drawings.

THE COMPOSITE

Referring now to FIG. 1, the composite made in accordance with the present invention is designated generally by a numeral 10. The composite 10 includes a layer 11 of a fire retardant composition which provides a protective insulating heat barrier when exposed to fire. The presently preferred fire retardant composition is a neoprene foam disclosed in U.S. Pat. Nos. 4,174,420 and 4,294,489, and the most preferred fire retardant composition is VONAR TM. The disclosures of U.S. Pat. Nos. 4,174,420 and 4,294,489 are incorporated herein by reference.

The composite 10 also includes a layer 14 of material that possesses a high tensile strength along its surface. The preferred material for the layer 14 is a woven or nonwoven fiberglass fabric, scrim or cloth (hereinafter collectively referred to as "fabric"). The most preferred is synthetic fiber-fiberglass composite fabric, such as spun bonded polyester-fiberglass fabric. An example of such fabric is Remay TM -fiberglass fabric composite and in particular Style 1659 FIBERGLAS fabric manufactured and sold by Burlington Glass Fabrics Company, Link Drive, Rockleigh, N.J. 07647.

In the preferred embodiment of the invention depicted in the drawings, the neoprene foam is directly, chemically bonded to the fiberglass fabric without any adhesives. Adhesives can, however, be used for making the composites of the present invention.

When exposed to a fire, the fire retardant layer 12 chars forming a protective heat barrier. The charred layer 12 acts as a thermally insulative barrier to the fire. Once it chars, the layer 12 has a minimal tensile strength to resist stresses in the directions along its surface; however, the layer 14 possesses high tensile strength and prevent breaking of the composite 10 that is under tension.

Another embodiment of the composite of the present invention is shown in FIG. 2. Referring now to FIG. 2, a composite, designated generally by a numeral 20, includes a fire-retardant layer 22, a layer a high tensile strength material 24 and another fire-retardant layer 26. The layers 22, 24 and 26 are directly, chemically bonded to each other, as shown, preferably without any adhesives. The layers 22 and 26 can be made of the same compounds as the layer 12 including a fire-retardant neoprene foam, such as VONAR TM. The layer 26 provides an addtional heat barrier which is especially useful when the layer 24 is made of a loosely woven material. When the composite 20 is exposed to a fire, the charred layer 20 may become displaced in places, the fire penetrating through the layer 24 then encounters the layer 26 which chars, preventing the materials enclosed by the composite from being exposed to high temperatures or from being ignited.

THE PROCESS FOR MAKING THE COMPOSITE

The presently preferred process for making the composite 10 of the present invention will now be described with reference to FIG. 3. As shown in FIG. 3, the fiberglass fabric 28 stored on a spool 30 is continuously placed onto an endless belt 32 driven by rollers 34 and 36.

A layer of uncured fire-retardant neoprene foam 38, such as VONAR TM, is then deposited on the fiberglass fabric 28 from the holding container (hopper) 40 via a nozzle 42. The layer 38 is transported on the fiberglass fabric 28 by the endless belt 32 toward a plough 45 which pushes off the excess of neoprene foam and produces a layer of neoprene foam 38 of uniform predetermined thickness. The desired thickness of the neoprene foam layer 38 can be varied by moving the plough 45 toward or away from the endless belt 32.

The adjacent layers 28 and 38 are then transported to a curing station, such as a heater 47, which is maintained at such conditions, including temperature, to effect the curing of the neoprene foam. Upon curing the neoprene foam 38 becomes firmly bonded to the fiberglass fabric 28. The resulting composite is then wound onto a spool 50.

The composite 20 can be made by the process for making composite 10 merely by repeating the procedures so as to deposite the fire-retardant composition on both sides of the fiberglass fabric. In the alternative, if the fiberglass fabric is loosely woven, the uncured fire-retardant can merely be allowed to go through the openings in the fiberglass fabric to achieve the composite 20.

THE MATTRESS

The improved mattress of the present invention will now be described in connection with the embodiment depicted in FIGS. 4 and 5. Referring now to FIG. 4, the mattress constructed in accordance with the present invention is generally designated by a numeral 60. As shown in FIGS. 4 and 5, on the outside, the mattress 60 includes a conventional ticking (cover) 62 which is provided to give a soft comfortable feel for the user. Underneath the ticking 62 there is a composite layer 64 of the present invention. Either composition 10 or composite 20 can be used to form layer 64. The layer 64 includes a layer of fire retardant composition, such as VONAR TM, bonded to a layer of high tensile strength material such as a fiberglass fabric. Since the fiberglass fabric is inside of the cover and inside the layer of VONAR TM, the fiberglass fabric has little effect on the "feel" of the mattress. Additionally, as described below, the fiberglass fabric is preferably a composite in which fiberglass fibers are enclosed by a material that prevents fiberglass fibers from breaking off. Most preferably, the fabric is a relatively inexpensive loosely woven fiberglass fabric composite made of polyester and fiberglass fibers such as style 1659 FIBERGLAS fabric manufactured and sold by Burlington Glass Fabrics Company, Link Drive, Rockleigh, N.J. 07647.

Although FIG. 4 depicts a mattress that includes a two component composite of the present invention, it should be understood that three component composites such as that shown in FIG. 2 can also be used. The higher cost composite 20 of FIG. 2 when compared to composite 10 of FIG. 1 must be weighed against additional fire protection offered by the extra layer of a fire retardant 26.

Beneath the composite layer of the present invention is a layer of standard padding such as cotton felt or polyurethane foam 68 and beneath the layer of standard polyurethane 68 is a layer of standard backing 69 or other standard insulating material. The ticking 62, composite layer 64, layer 68 and standard backing 69 are preferably quilted together as shown in FIG. 5.

Beneath the backing 69, there is a layer 72 of precompressed cotton felt which cushions and resists body impressions. Beneath the layer 72 is a firmness insulator layer 73 which further controls the firmness of the mattress. The layer 73 is supported on a wire mesh 74 which, in turn, rests on coil springs 75.

The composite layer 64 of the present invention is under each exposed surface of the mattress 60. The side surfaces of the mattress 60 are connected to the materials at the top surface, as shown in FIG. 5, by a high-strength fire-resistant thread such as a fiberglass thread 80 that has a melting point above temperatures generally encountered in room fires. The fire-resistant thread assures that the mattress does not split open by burning of the thread.

If fire reaches the mattress, the fire can ingite the cover 62 even though it is preferably treated to make it fire retardant. The cover 62 is relatively thin therefore it does not provide much fuel for the fire but it also does not provide a heat barrier. After the cover 62 is consumed the fire reaches the composite 64. The outside fire retardant layer of the composite 64 chars protecting the inside of the mattress 60 from the fire. The inside layer of the composite layer 64 provides a sufficient strength to the composite layer 64 to maintain it intact even after the fire retardant layer is charred.

If the composite layer 64 is composed of three layers as that shown in FIG. 2, the additional layer of fire retardant composition 36, provides additional protection against heat and against flames entering inside the mattress and igniting the flammable parts thereof.

It should, of course, be understood that although the present invention is shown in the drawings with a particular mattress, its use is not limited to that particular mattress and the invention can be used in connection with any other mattress.

THE PREFERRED HIGH TENSILE STRENGTH MATERIAL

The preferred tensile strength material is a fiberglass fabric composite in which the fiberglass fibers are prevented from breaking off and separating from the composite by another material such as a layer of polyester bonded thereto. The preferred fiberglass fabric composite is depicted in FIGS. 6–8.

Figure 7:
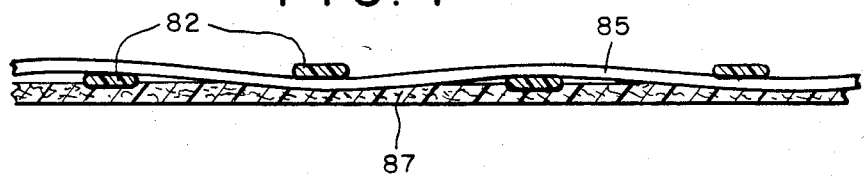
FIG. 7 is a cross-sectional view of the fiberglass fabric of FIG. 6 taken along line 7—7 thereof.

Referring now to FIG. 6, there is shown there a fabric composite 80 which includes a mesh 81 composed of intersecting rows of strands of fiberglass fibers 82 and 85. Each of the strands 82 and 85 includes a plurality of long fiberglass fibers. Bonded to one side of the fiberglass fiber strands 82 and 85 is a layer 87 of polyester such as Remay TM. The composite 80 offers good tensile strength in the direction along its surface and prevents the fiberglass fibers within it from breaking off and separating therefrom.

Figure 8:
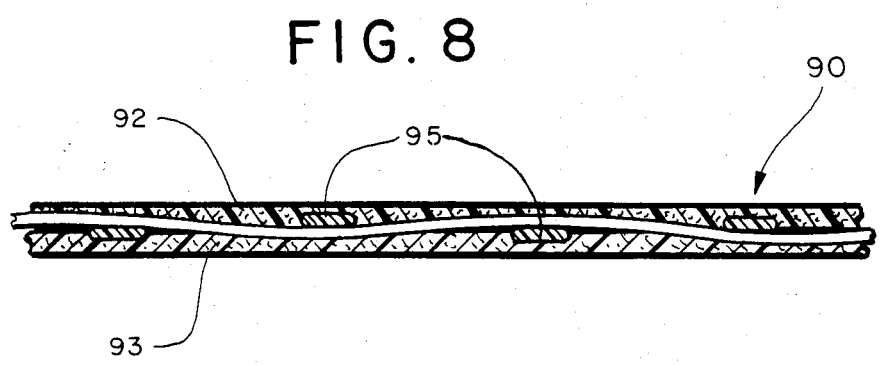
FIG. 8 is a cross-sectional view of another fiberglass fabric useful in the composite of the present invention.

FIG. 8 depicts another fiberglass composite 90 useful in connection with the present invention. The composite 90 has two layers of materials 92 and 93 for keeping the fiberglass fibers from breaking off and separating on either side of the fiberglass fiber mesh 95. The cost of the additional layer of material to enclose fiberglass fiber mesh 95 has to be weighed against the additional protection which such layer provides.

At present, the composite 80 is preferred because when the fire retardant layer is bonded to the composite 80 on the fiberglass mesh side of said composite, the fiberglass fibers are sandwiched between the polyester and the fire retardant layer and have been found not to break off and separate from the composite 80.

Many changes and modifications will occur to those skilled in the art upon studying this disclosure and the appended claims. All such changes and modifications that fall within the spirit of this invention defined by the appended claims, are intended to be included within its scope.

I claim:

1. In a mattress comprising a cover and a plurality of flammable components, a composite comprising a first layer of a fire-retardant composition bonded to a second layer of a material having a high tensile strength in the directions along its surface, the composite substantially enclosing the flammable components and oriented such that the material having a high tensile strength is disposed adjacent to at least one of the flammable components and the fire-retardant composition is disposed adjacent to the cover.

2. The composite claimed in claim 1 wherein said first layer comprises a fire-retardant neoprene foam and said second layer comprises a fiberglass fabric.

3. The composite claimed in claim 1 wherein said first layer comprises a fire-retardant neoprene foam and said second layer is made of fiberglass fabric comprising at least one retaining layer of material bonded to a mesh of fiberglass fibers so as to prevent said fiberglass fibers from breaking off.

4. The composite claimed in claims 1, 2 or 3 further comprising a third layer composed of a fire retardant composition, said third layer being bonded to said second layer on the opposite side from said first layer.

5. The composite claimed in claim 4 wherein said third layer is made of fire-retardant neoprene foam.

6. In a mattress, the improvement comprising:
a composite layer enclosing substantially all of the flammable components of said mattress, said composite layer comprising a first layer of a fire retardant composition bonded to a second layer of a material having high tensile strength in directions along its surface, said first layer of said composite layer charring upon being exposed to fire to protect the inside of said mattress from heat and fire and said second layer preventing the mattress from bursting open upon being exposed to fire.

7. The mattress of claim 6 wherein:
said first layer is made of fire-retardant neoprene foam and said second layer is made of a fiberglass fabric.

8. The mattress of claim 6 wherein said first layer is made of a fire-retardant neoprene foam and said second layer is made of a fiberglass fabric comprising a layer of material bonded to a mesh of fiberglass fibers so as to prevent said fiberglass fibers from breaking off.

9. The mattress of claims 6, 7 or 8 wherein said composite layer further comprises a third layer made of a fire retardant composition bonded to said second layer on the opposite side from said first layer.

10. The mattress of claim 9 wherein said third layer is made of fire-retardant neoprene foam.

* * * * *